United States Patent [19]

Hyodo et al.

[11] Patent Number: 4,754,831
[45] Date of Patent: Jul. 5, 1988

[54] CONSTANT SPEED RUNNING APPARATUS

[75] Inventors: Hitoshi Hyodo, Okazaki; Tokihiko Akita, Toyota, both of Japan

[73] Assignee: Aisin Seiki Kabushiki Kaisha, Japan

[21] Appl. No.: 938,086

[22] Filed: Dec. 4, 1986

[30] Foreign Application Priority Data

Dec. 4, 1985 [JP] Japan ................. 60-274137

[51] Int. Cl.$^4$ ............................................. B60K 31/00
[52] U.S. Cl. ................................... 180/176; 123/360; 364/431.07
[58] Field of Search ............... 123/360; 180/176, 177, 180/175; 364/431.07

[56] References Cited

U.S. PATENT DOCUMENTS

| 3,570,622 | 3/1971 | Wisner | 180/176 |
| 3,999,622 | 12/1976 | Reed | 180/177 |
| 4,335,799 | 6/1982 | Shields | 123/360 X |
| 4,457,392 | 7/1984 | Caldwell et al. | 123/360 X |

FOREIGN PATENT DOCUMENTS 60-76429  4/1985  Japan .

Primary Examiner—John J. Love
Assistant Examiner—Michael Mar
Attorney, Agent, or Firm—Sughrue, Mion, Zinn, Macpeak, and Seas

[57] ABSTRACT

A constant speed running apparatus has a surge tank for storing a vacuum for driving a vacuum actuator, a vacuum switch for judging the amount of vacuum stored in the surge tank, and a vacuum pump activated when the amount of vacuum stored in the tank decreases so as to supply the vacuum to the tank. When a switch for starting a constant speed running is actuated, the pump is activated for a predetermined period of time to replenish the vacuum before the vacuum switch is activated. Accordingly, it is possible to maintain the internal pressure in the surge tank at a sufficiently high level when a constant-speed running control is started, and consequently improve the response of the actuator.

8 Claims, 12 Drawing Sheets

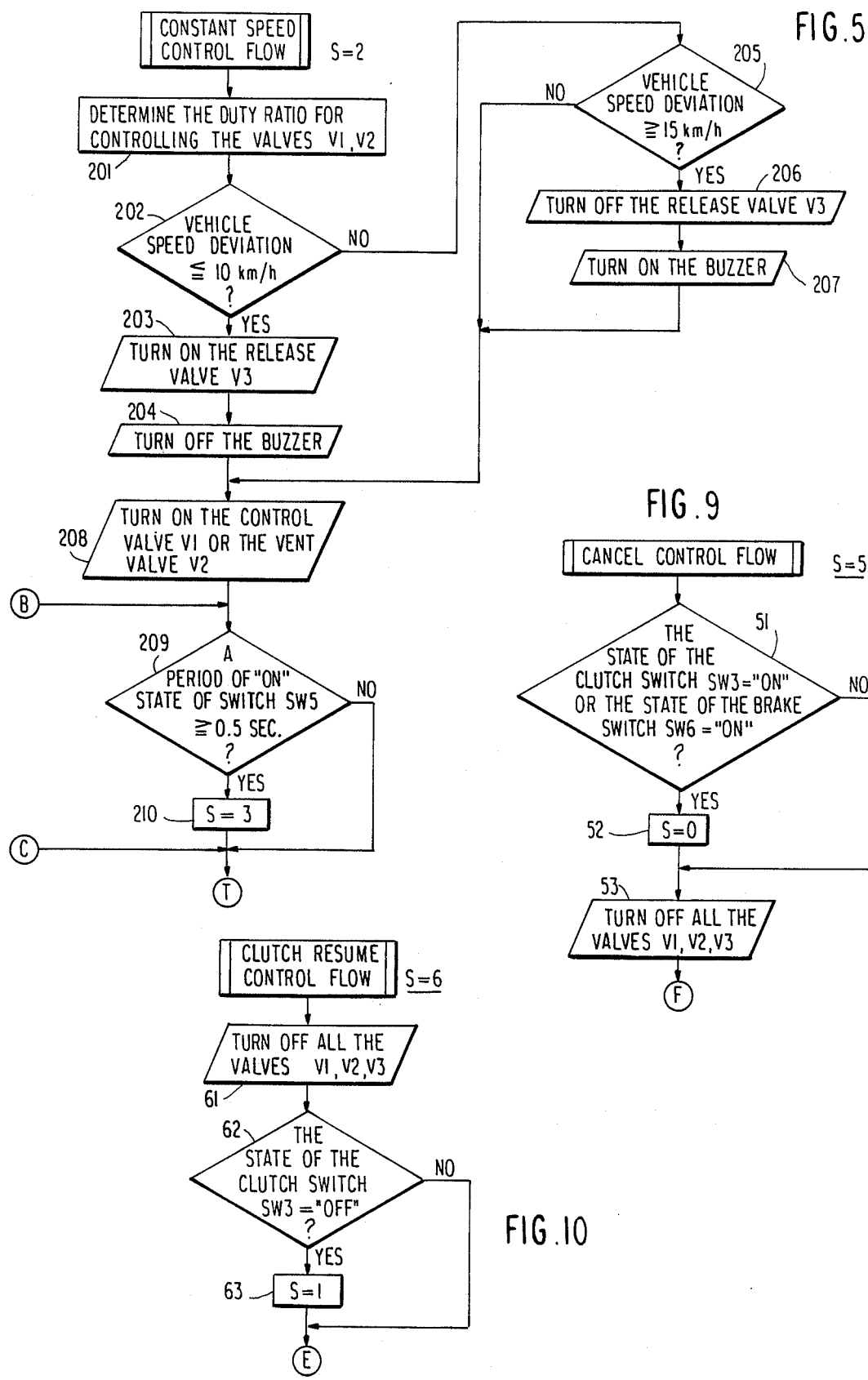

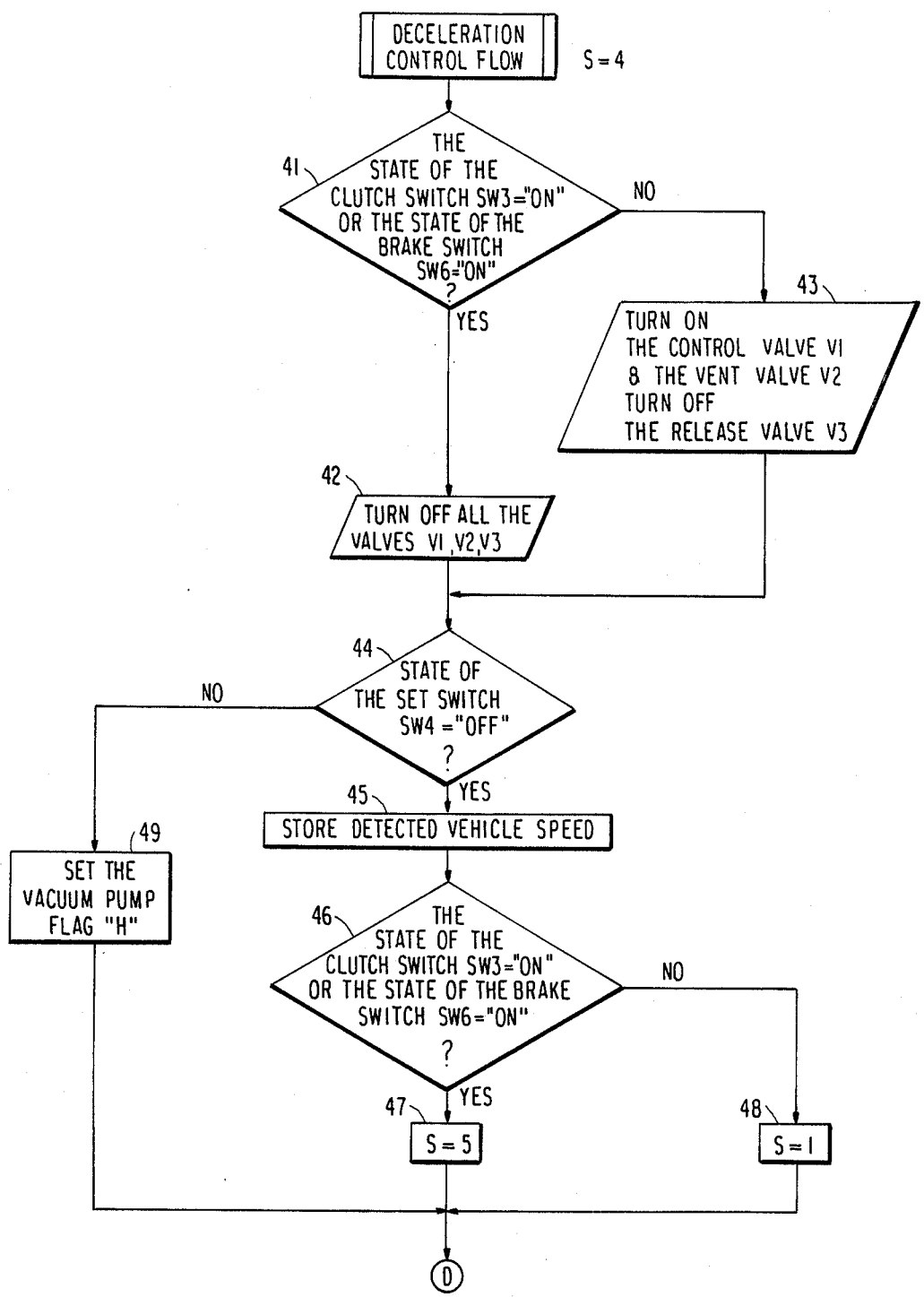

CONSTANT SPEED RUNNING APPARATUS

BACKGROUND OF THE INVENTION

The present invention relates to a constant speed running apparatus which stores a running speed of a vehicle in memory and enables the running speed of the vehicle to be automatically maintained at the stored speed. More particularly, the present invention pertains to a constant speed running apparatus so designed that the level of a power source for driving the apparatus has already been raised to an operative level at the time of starting a constant speed running control.

Japanese Patent Publication No. 60-76429, published Apr. 30, 1985, employs a vacuum source such as an intake manifold as a power source for driving a constant speed running apparatus and which uses a vacuum pump as an auxiliary power source for insuring the vacuum obtained from the vacuum source. In particular, Diesel vehicles, which cannot utilize a vacuum from an intake manifold as a vacuum source for a constant speed running apparatus, have heretofore needed to be provided with a power source such as a vacuum pump for driving a constant speed running apparatus.

In general, a vacuum which is utilized for driving the constant speed running apparatus of the type described above is stored in a surge tank by the operation of a vacuum pump, and when the internal pressure in the surge tank rises above a set value as a result of consumption of the stored vacuum by a constant speed running control, a vacuum switch is turned on to deliver a detection signal to a control circuit which, in turn, activates the vacuum pump for a predetermined period of time so that the vacuum for driving the apparatus is restored in the surge tank.

The above described arrangement suffers, however, from the following problems.

Simultaneously with the starting of a constant speed running control, the vacuum stored in the surge tank is supplied to a vacuum actuator through piping, causing the internal pressure in the surge tank to become much higher than a set value for a vacuum switch, and thus resulting in undershoot, which means that the response of the vacuum actuator is unsatisfactory. The response of the vacuum actuator can be improved by increasing the capacity of the vacuum pump. However, an increase in the pump capacity undesirably involves various problems such as an increase in size of the vacuum pump, which leads to a rise in cost and weight. Further, since the operation of the vacuum actuator depends on the capacity of the vacuum pump, there may be variations in the operation of the vacuum actuator which involves problems in terms of reliability.

On the other hand, if the set value for the vacuum switch is lowered, the number of times of activation of the vacuum pump is increased and this disadvantageously leads to a reduction in the lifetime of components of the system, such as the vacuum pump, the vacuum switch, etc.

SUMMARY OF THE INVENTION

In view of the above described circumstances, it is a primary object of the present invention to provide a constant speed running apparatus so designed that the internal pressure in the surge tank is maintained at a relatively low level at the time of starting a constant speed running control, thereby improving the response of the vacuum actuator.

To this end, the present invention provides a constant speed running apparatus wherein, at the same time a set switch or a resume switch for starting a constant speed running apparatus is turned on, a pump means, such as vacuum pump, is activated for a predetermined period of time so that the level of the vacuum which is to be supplied to an actuator means is made higher than a set level which is set for a judging means, such as a vacuum switch for judging the level of the vacuum, before the judging means is turned on, and when the vacuum is supplied to the actuator means, a constant speed running control is started by the judging means.

By virtue of the above described arrangement, it is possible to prevent occurrence of a delay in the response of the actuator means which would otherwise occur due to undershoot caused when the level of the vacuum becomes lower than a predetermined level at the beginning of a constant speed running control.

The above and other objects, features and advantages of the present invention will become more apparent from the following description of the preferred embodiment thereof, taken in conjunction with the accompanying drawings.

BRIEF DESCRIPTION OF THE DRAWINGS

FIGS. 2 to 12 show, in combination, a flowchart of a constant speed running control effected by an electronic controller.

DESCRIPTION OF THE PREFERRED EMBODIMENT

The present invention will be described hereinunder in detail by way of one preferred embodiment and with reference to the accompanying drawings.

Figure 1:
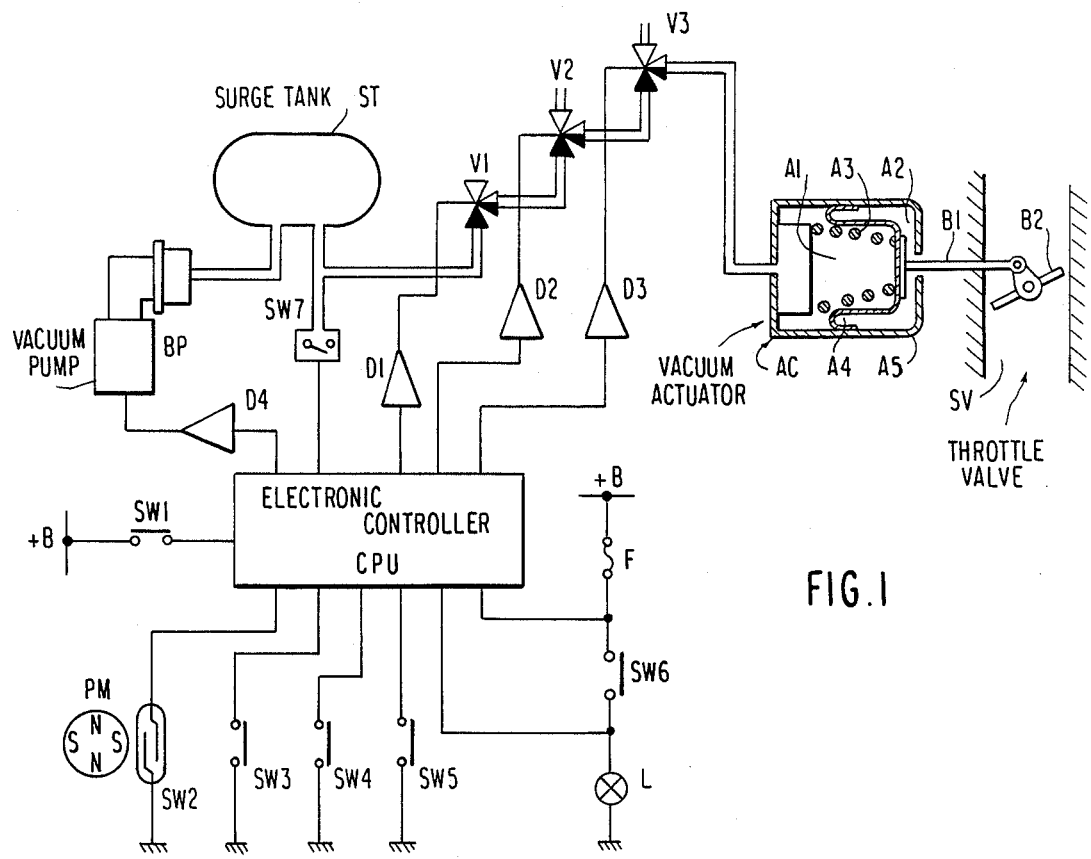
FIG. 1 shows the general arrangement of one embodiment of the constant speed running apparatus according to the present invention.
Figure 2:
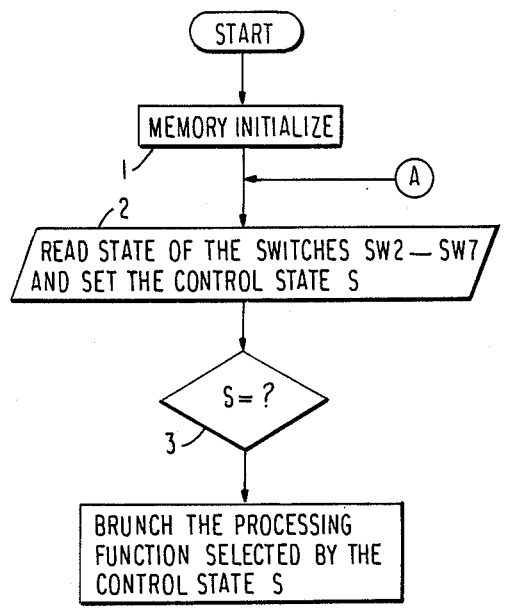
Figure 3:
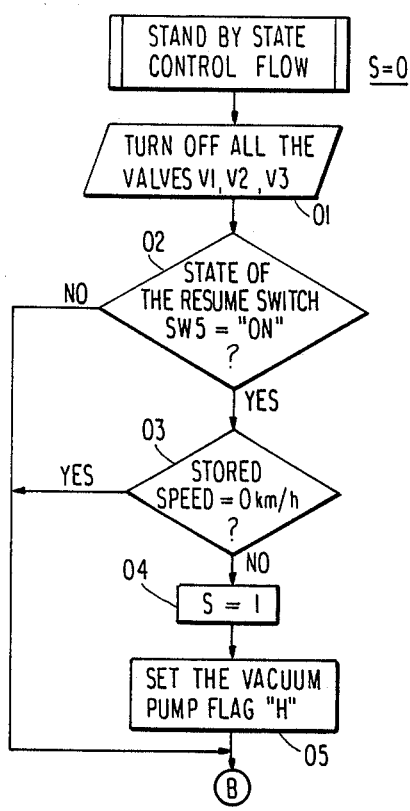
Figure 4:
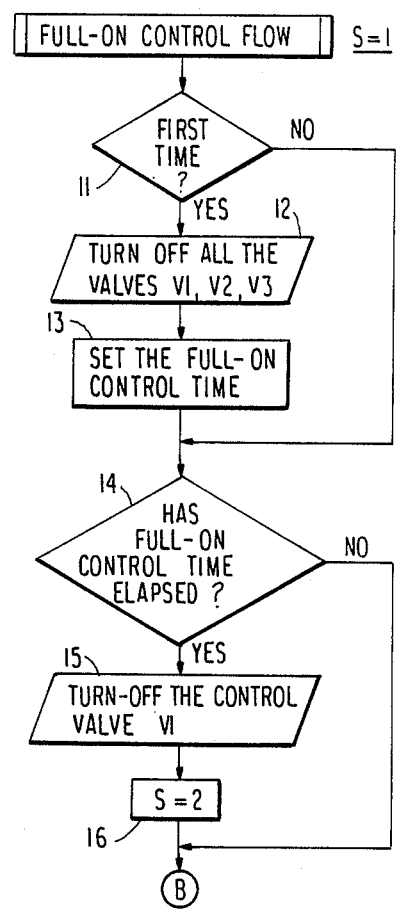
Figure 7:
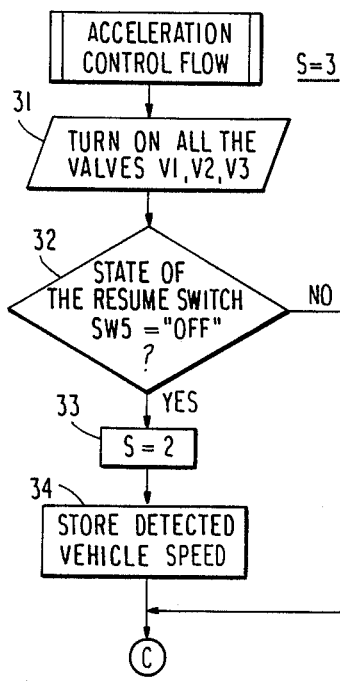
Figure 6:
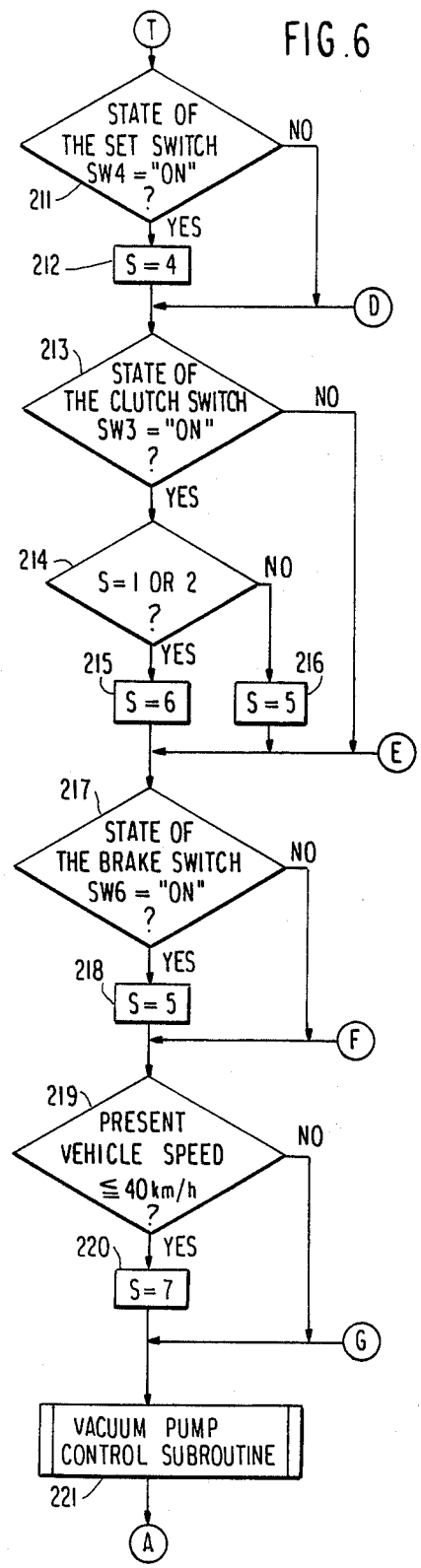
Figure 11:
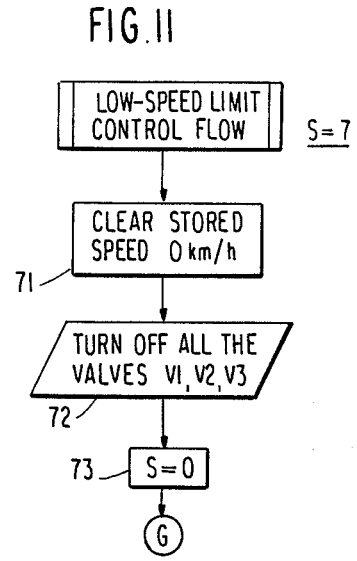

FIG. 1 shows the general arrangement of one embodiment of the constant speed running apparatus according to the present invention.

In this arrangement, an electronic controller CPU is defined by a single chip microcomputer to which are input the respective outputs of a reed switch SW2 for detecting a vehicle speed signal, a clutch switch SW3 for detecting the fact that a clutch pedal (not shown) is stepped on, a brake switch SW6 for detecting the fact that a brake pedal (not shown) is stepped on, a set switch SW4, a resume switch SW5 and a vacuum switch SW7 which is disposed on a surge tank ST for storing a vacuum which is produced by a vacuum pump BP to activate a vacuum actuator AC for controlling the degree of opening of a throttle valve SV.

The resume switch SW5 is actuated to resume a constant-speed running control, which has once been canceled, so that the vehicle is controlled at a stored running speed. The clutch switch SW3 and the brake switch SW6 define switching means for canceling a constant speed running control.

A permanent magnet PM which is connected to a speedometer cable (not shown) is disposed in the vicinity of the reed switch SW2. The arrangement is such that, when the permanent magnet PM is rotated in response to the movement of the vehicle, the contacts of the reed switch SW2 come in and out of contact with each other, thus delivering pulses (a vehicle speed signal) of a frequency proportional to the speed of the vehicle to the electronic controller CPU.

The clutch switch SW3 is opened and closed in response to the movement of the clutch pedel mounted on the vehicle, while the brake switch SW6 is opened and closed in response to the brake pedal mounted on the vehicle. A stop lamp L is connected to the brake switch SW6, and the stop lamp L is lit up when the brake switch SW6 is turned on (closed).

The set and resume switches SW4 and SW5 are push-button switches which are respectively disposed at such positions that the driver can readily actuate them. When the set switch SW4 is pressed, a vehicle speed is stored in memory, and a constant speed running control is started. Although when the brake switch SW6 is pressed, a constant speed running is canceled, the stored vehicle speed is left as it is. When the resume switch SW5 is pressed, a constant speed running control is started with a vehicle speed which has been stored in memory before the cancellation of the constant speed running.

It should be noted that a power supply is connected to the brake switch SW6 through a fuse F, and a power supply is connected to the electronic controller CPU through a power switch SW1.

To output terminals of the electronic controller CPU are respectively connected a solenoid of a control valve V1 for controlling a vacuum actuator AC (described later) through a drive circuit D1, a solenoid of a vent valve V2 through a drive circuit D2, and a solenoid of a release valve V3 through a drive circuit D3. Further, the electronic controller CPU is connected to a motor or other means for driving the vacuum pump BP through a drive circuit D4.

The following is a description of the arrangement and operation of the vacuum actuator AC.

The vacuum actuator AC has a vacuum chamber A1 which is defined and sealed by a diaphragm A4 disposed within a housing A5, an atmosphere chamber A2 being defined on the side of the diahragm A4 which is remote from the vacuum chamber A1. The diahragm A4 is biased by a compression coil spring A3 disposed within the vacuum chamber A1. It should be noted that a throttle rod B1 for opening and closing a valve body B2 of the throttle valve SV is connected to the diaphragm A4.

The vacuum stored in the surge tank ST is introduced into the vacuum chamber A1 of the vacuum actuator AC through the control valve V1, the vent valve V2 and the release valve V3.

The control valve V1 is arranged such that, when the associated solenoid is in an energized state, the valve V1 allows the vacuum sent from the surge tank ST to be delivered toward the vacuum actuator AC, whereas, when the solenoid is not energized, the valve V1 cuts off the supply of the vacuum toward the vacuum actuator AC. The vent valve V2 is arranged such that, when the associated solenoid is in an energized state, the valve V2 allows the vacuum sent from the control valve V1 to be delivered toward the vacuum actuator AC, whereas, when the solenoid is not energized, the valve V2 allows the vacuum present on the vacuum actuator side to be released to the atmosphere. Further, the release valve V3 is arranged such that, when it becomes impossible to effect an appropriate control due to any abnormality occurring in the control system, the valve V3 allows the vacuum present in the vacuum chamber A1 of the vacuum actuator AC to be released to the atmosphere, thus bringing the vacuum chamber A1 into an atmospheric pressure state. At this time, the throttle valve SV is pushed back by the throttle rod B1 to close the valve body B2. Normally, the solenoid of the release valve V3 is in an energized state, and the vent valve V2 and the vacuum chamber A1 of the vacuum actuator AC are in communication with each other.

The control of the control valve V1 and the vent valve V2 is effected through a duty-ratio control performed by the electronic controller CPU. More specifically, during a constant speed running control, a vehicle speed stored in memory and a present vehicle speed are compared with each other in the electronic controller CPU, and a duty ratio between signals for energizing the respective solenoids of the control valve V1 and the vent valve V2 is determined so that the stored vehicle speed and the present vehicle speed are equal to each other. For example, when the vehicle speed needs to be decelerated, the duty ratio is decreased to increase the rate of time during which the atmosphere is allowed to enter the vacuum actuator AC from the vent valve V2, thus closing the throttle valve SV through the diaphragm A4. On the other hand, when the vehicle speed needs to be accelerated, the duty ratio is increased so as to open the throttle valve SV through the vacuum actuator AC.

The operation of the microcomputer, which defines the electronic controller CPU, will next be explained with reference to the flowchart shown in FIGS. 2 to 12.

When the ignition switch is turned on, the main program is started. The memory is first initialized in Step 1. At this time, a control state S=0 which represents "stand-by state control flow" as one of the branch programs is set. The respective states of the switches SW2 to SW7 are read in Step 2.

Step 3 is a branch step in which the control state S is judged, and a processing function corresponding to the judged control state S is selected. More specifically, since this control program has been programmed so that the program is branched off in correspondence with each control state, and the microcomputer functions according to each branched program, a control state S is designated for each function to start a flow for each control state.

Since the control state S=0 has been set in Step 1, "stand-by state control flow" represented by S=0 is started in Step 3.

Control State S=0: "Stand-by State Control Flow"

In this flow, an actuated state of the resume switch SW5 is detected, and the control system is maintained in a canceled state.

In this flow, all the valves, that is, the control valve V1, the vent valve V2 and the release valve V3, are turned off in Step 01, thereby suspending the control of the vacuum actuator AC, and thus suspending a constant speed running control. An actuated state of the resume switch SW5 is then detected in Step 02. If the switch SW5 is ON, a vehicle speed stored in memory is read in Step 03. If the stored vehicle speed is not 0 km/h (a cleared state), a control state S=1 which represents "full-on control flow" is set in Step 04. Further, a vacuum pump flag for activating the vacuum pump BP is set (raised to a high level "H") in Step 05. In other words, preparation for starting "full-on control flow" represented by the control state S=1 is made.

When the resume switch SW5 is OFF, or when the stored vehicle speed is 0 km/h (a cleared state), this fact means the negation of the resume function, and therefore the control state S is not changed.

Control State S=1: "Full-On Control Flow"

In this flow, an anticipated control is effected for the purpose of quickly driving the vacuum actuator AC to a predetermined operative position. More specifically, in "deceleration control flow" which is represented by a control state S=4, the control valve V1 is OFF, which means that the pressure within the vacuum chamber A1 of the vacuum actuator AC is at a relatively low level, and since "stand-by control flow" is executed when this constant-speed running control is started or after the execution of "cancel control flow", the vacuum in the vacuum chamber A1 of the vacuum actuator AC is not coincident with a set speed. Therefore, if, in this state, the constant-speed running control is resumed and the control valve V1 is subjected to a duty ratio control, it is impossible for the throttle opening to reach a predetermined degree of opening immediately. For this reason, a judgement is made in Step 11 as to whether or not this is the first time that this flow has been entered. If YES, all the valves V1, V2 and V3 are turned on in Step 12, and a full-on control time which has been predetermined so as to be elongated in proportion to the vehicle speed is set in Step 13. If it is judged in Step 11 that this flow is entered after a full-on control time has been set, a judgement is made in Step 14 as to whether or not the set full-on control time has elapsed. If YES, the control valve V1 is first turned off in Step 15, and a control state S=2 is set in Step 16. The process then enters "constant speed control flow".

Control State S=2: "Constant-Speed Control Flow"

This flow is executed to effect a constant-speed running at a vehicle speed stored in memory. A vehicle speed is obtained in Step 201 from pulses delivered from the reed switch SW2, and a duty ratio for opening and closing the control valve V1 and the vent valve V2 is determined from the obtained vehicle speed.

Steps 202 to 207 are executed when the vehicle speed cannot be controlled to a stored vehicle speed for some reasons during a vehicle speed control by duty ratio control. When the vehicle speed deviation exceeds 15 km/h in Step 205, the release valve V3 is turned off in Step 206 so that the vacuum in the vacuum chamber A1 of the vacuum actuator AC is reduced to equal the atmospheric pressure, thus canceling the control of the throttle valve SV. Then, a buzzer is turned on in Step 207 to inform the driver of the fact that the vehicle speed cannot be controlled to a stored vehicle speed. When the vehicle speed deviation is smaller than 10 km/h, the release valve V3 is turned on in Step 203, and the buzzer is turned on in Step 204. Thus, the duty ratio control of the control valve V1 and the vent valve V2 acts effectively in Step 208, and it becomes possible to effect a constant-speed running control of the vehicle in a satisfactory way. In this control, a period of time during which the vehicle speed is accelerated from a vehicle speed deviation of 10 km/h in Step 202 to a vehicle speed deviation of 15 km/h in Step 205, or a period of time during which the vehicle speed is decelerated from a vehicle speed deviation of 15 km/h in Step 205 to a vehicle speed deviation of 10 km/h in Step 202, corresponds to the hysteresis of a set value for resuming the control of the vacuum actuator AC.

After the resume switch SW5 has been turned on for a predetermined period of time (0.5 second in this case) in Step 209, a control state S=3 which represents "acceleration control flow" is set in Step 210. When the set switch SW4 is turned on in Step 211, a control state S=4 which represents "deceleration control flow" is set in Step 212. When the clutch switch SW3 is ON in Step 213, a judgement is made in Step 214 as to whether or not the control state S=1 or S=2 is available. More specifically, since the clutch switch SW is provided with a resume function, a judgement is made as to whether the process has entered this flow from "acceleration control flow" or "deceleration control flow". When this flow has been entered from either one of these flows, a control state S=6 which represents "clutch resume control flow" is set in Step 215. When the process has entered this flow from any flow other than said two flows, a control state S=5 which represents "cancel control flow" in which cancelleration of control is executed in response to turn-on of the clutch switch SW3 is set in Step 216. When the brake switch SW6 is turned on in Step 217, a control state S=5 representing "cancel control flow" is set in Step 218. A judgement is made in Step 219 as to whether or not the present vehicle speed is lower than a predetermined control vehicle speed. If YES, a control state S=7 is set in Step 220 to inhibit a constant-speed running control. The process then starts "vacuum pump control subroutine" in Step 221.

Control State S=3: "Acceleration Control Flow"

In this flow, the vehicle speed is accelerated during a constant speed running control to renew a constant speed running speed. In Step 31, all the valves, that is, the control valve V1, the vent valve V2 and the release valve V3, are turned on to increase the vacuum in the vacuum chamber A1 of the vacuum actuator AC, thus opening the throttle valve SV, and the vehicle speed is accelerated in Step 32 until the resume switch SW5 is turned off. When the resume switch SW5 is turned off, a control state S=2 representing "constant speed control flow" is set in Step 33, and a vehicle speed detected at this time is stored in memory in Step 34.

Control Step S=4: "Deceleration Control Flow"

This flow is executed to decelerate the vehicle speed during a constant-speed running control and resume the constant speed running control. When the set switch SW4 is turned on during a constant-speed running control, a control state S=4 is set, and this "deceleration control flow" is started. A judgement is made in Step 41 as to whether or not either the clutch switch SW3 or the brake switch SW6 which have a cancel function is ON. If YES, all the valves V1, V2 and V3 are turned off in Step 42 to suspend the constant-speed running control which has been effected after the starting of this "deceleration control flow". If it is judged in Step 41 that both the clutch and brake switches SW3 and SW6 are OFF, the control valve V1 and the vent valve V2 are turned off, while the release valve V3 is turned on in Step 43. When the supply of a vacuum to the vacuum actuator AC is cut off in this way, the throttle valve SV is gradually closed, so that the vehicle speed decreases gradually. When the set switch SW4 is turned off in Step 44, a vehicle speed detected at the time when the set switch SW4 has been turned off is stored in memory in Step 45. A judgement is made again in Step 46 as to whether or not either the clutch switch SW3 or the brake switch SW6 which have a cancel function is ON. If NO, a control state S=1 is set in Step 48 to start "full-on control flow". More specifically, the deceleration control is continued as long as the set switch SW4 is ON, and the constant-speed running is resumed with a vehicle speed detected at the time when the set switch SW4 is turned off. When either the cltuch switch SW3 or the brake switch SW6 is turned on in Step 46, a control state S=5 is set in Step 47 to start "cancel control flow". If the set switch SW4 is ON in Step 44, the vacuum pump flag is set (raised to the high level "H") in step 49.

Control State S=5: "Cancel Control Flow"

This flow is executed to cancel a constant-speed running control when either the clutch switch SW3 or the brake switch SW6 is turned on during the processing of "constant speed control flow" represented by the control state S=2. When either one of the clutch switch SW3 and the brake switch SW which have a cancel function is turned on in Step 51, "stand-by state control flow" represented by the control state S=0 is selected in Step 52, and all the valves V1, V2 and V3 are turned off in Step 53.

Control State S=6: "Clutch Resume Control Flow"

This flow is executed to cancel a constant-speed running control when the clutch switch SW3 is turned on during the processing of "constant-speed control flow" represented by the control state S=2, and then to resume the constant-speed running control. All the valves V1, V2 and V3 are first turned off in Step 61, and when the clutch switch SW3 is judged to be turned off in Step 62, "full-on control flow" represented by the control state S=1 is started in Step 63.

Control State S=7: "Low-Speed Limit Control Flow"

This flow is executed to cancel the present constant-speed running control and clear the stored vehicle speed when the present vehicle speed is lower than a predetermined speed in Steps 219 and 220. The stored vehicle speed is cleared in Step 71, and all the valves V1, V2 and V3 are turned off in Step 72. Then, "stand-by state control flow" represented by the control state S=0 is started in Step 73.

The following is a description of the control effected in accordance with "vacuum pump control subroutine".

"Vacuum Pump Control Subroutine"

The processing of "vacuum pump control subroutine" is started in Step 221. A judgement is made in Step 81 as to whether or not the vacuum pump flag is set ("H"). If YES ("H"), until a period fo time set on a timer T1 has elapsed in Step 82, the vacuum pump BP is activated in Step 83. When the time set on the timer T1 has elapsed in Step 82, the vacuum pump flag is reset (changed to a low level "L") in Step 84, and the timer T1 is then cleared in Step 85. When the vacuum pump flag is not set ("L") in Step 81, a judgement is made in Step 86 as to whether or not the vacuum switch flag is set ("H"). If NO ("L"), a judgement is made in Step 91 as to whether or note the vacuum switch SW7 is ON. If NO, the operation of the vacuum pump BP is suspended in Step 90. If it is judged in Step 91 that the vacuum switch SW7 is ON, the vacuum switch flag is set ("H") in Step 92.

If the vacuum switch flag is once set ("H") in Step 92, a judgement is made in Step 86 as to whether or not the vacuum switch flag is set ("H"). If YES, until a period of time set on a timer T2 has elapsed in Step 87, the vacuum pump BP is activated in Ste 83. When the time set on the timer T2 has elapsed in Step 87, the vacuum switch flag is reset ("L") in Step 88, and the timer T2 is cleared in Step 89. Then, the operation of the vacuum pump BP is suspended in Step 90.

As described above, in the constant speed running apparatus according to the present invention, before the vacuum switch SW7 is turned on as a result of lowering of pressure in the surge tank ST, the resume switch is turned on in Step 04 in "stand-by state control flow" represented by the control state S=0, or the set switch is turned on in Step 49 in "deceleration control flow" represented by the control state S=4, thereby setting the vaccum pump flag, and thus activating the vacuum pump BP until a time set on the timer T1 has elapsed in "vacuum pump control subroutine". Therefore, it is possible to set the vacuum pump BP in an operative state and raise the vacuum in the surge tank ST before the vacuum switch SW7 is turned on in response to lowering of vacuum in the surge tank ST. Accordingly, the vacuum in the surge tank ST can be raised immediately before the vacuum is supplied to the vacuum actuator AC to start a constant-speed running control.

Figure 13:
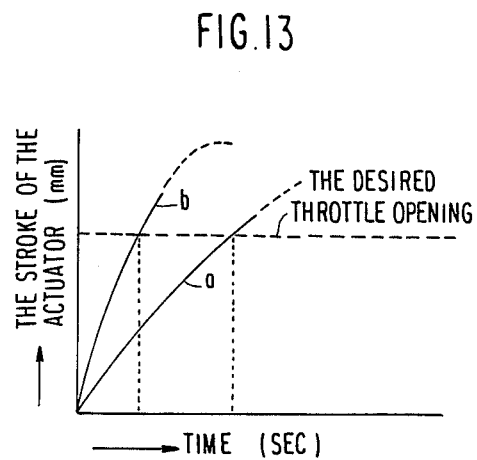
FIG. 13 is a graph showing the respective response characteristics of a conventional vacuum actuator and a vacuum actuator in accordance with the embodiment of the present invention.
Figure 12:
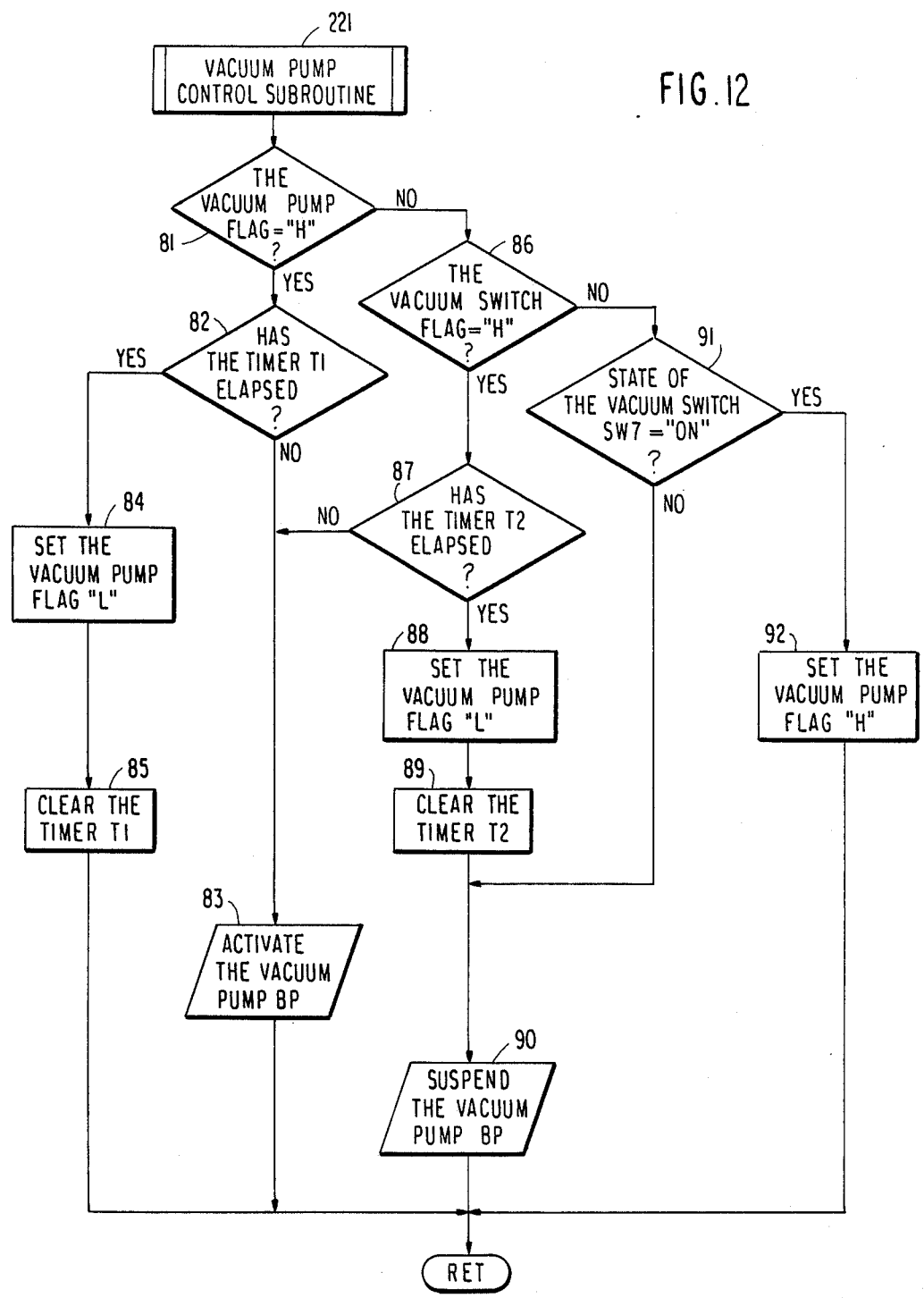

Thus, as shown in FIG. 13 which shows the respective response characteristics of a conventional vacuum actuator and the vacuum actuator AC in accordance with the present invention, the vacuum in the surge tank ST is not lowered in this embodiment in contrast to the response characteristics of the conventional vacuum actuator (represented by the curve a) even when the supply of vacuum from the surge tank ST to the vacuum actuator AC is started. It is therefore possible to effect a constnt speed running control with a favorably sharp rise of the response characteristic curve b, that is, a constant-speed running control with excellent response.

Since the response in a constant speed running control can be improved without increasing the capacity of the vacuum pump, it is unnecessary to increase the size of the vacuum pump, and there is no fear of the weight of the pump being increased. Since the control system alone needs to be changed in order to obtain the above-described advantages, the production cost is favorably low. It is, as a matter of course, possible for the vacuum in the surge tank to activate the vacuum actuator at the same time as the starting of a constant speed running control without depending on the capacity of the vacuum pump. Since it is unnecessary to raise the set value for the vacuum switch, the number of times of activation of the vacuum pump is not increased, which means that it is possible to extend the lifetime of the system An electronic control means, which makes a comparison between a vehicle speed stored in memory and a present vehicle speed and controls the actuator means so that the vehicle speed difference is zero, can be constituted by an electronic controller CPU such as a single chip microcomputer.

It should be noted that, although in the above described embodiment a vacuum is employed as a power source for driving the actuator means, the vacuum is not necessarily limitative when the present invention is carried out, and a positive pressure may also be employed. Further, the present invention may be applied to an arrangement in which a liquid is employed as a medium for driving the actuator means. It is a matter of course that a means which is activated when the amount of stored power source decreases so as to replenish the power source is defined by a pump means selected in conformity with the employed medium.

As has been described above, the present invention provides a constant speed running apparatus which comprises: means for storing a power source for driving actuator means; means for judging the amount of power source stored in said means; and pump means activated when the amount of the stored power source decreases so as to replenish the power source, and in which, when a switch for starting a constant-speed running is actuated, the pump means is activated for a predetermined period of time to replenish the power source before the judging means is activated. Accordingly, it is possible to maintain the internal pressure in the surge tank at a sufficiently high level when a cnstant speed running control is started, and consequently improve the response of the actuator.

Although the present invention has been described through specific terms, it should be noted here that the described embodiment is not necessarily exclusive and various changes and modifications may be imparted thereto without departing from the scope of the invention which is limited solely by the appended claims.

What is claimed is:

1. A constant speed running apparatus comprising:
   vehicle speed detecting means for detecting a running speed of a vehicle;
   storage means for storing a predetermined vehicle speed;
   actuator means for controlling the opening and closing operation of a throttle valve;
   electronic control means which makes a comparison between a vehicle running speed detected by said vehicle speed detecting means and a vehicle speed stored in said storage means and which controls said actuator means so that the difference between said running speed and said stored vehicle speed is zero;
   switching means for activating said electronic control means;
   accumulating means for accumulating a power source for driving said actuator means;
   power source supply means for supplying the power source to said accumulating means; and
   power source control means for controlling the operation of said power source supply means;
   wherein said power source supply means has judging means for judging the amount of power supply accumulated in said accumulating means and said power source supply means is activatible when the amount of power supply in said accumulating means decreases below a predetermined level, and
   wherein said power source supply merans is activatible in response to the operation of said switching means and has timing means whereby upon actuation of said power source supply means by said switching means said power source supply means will be activated for a predetermined period of time so that the level of power supply in said accumulating means is maintained higher than said predetermined level prior to turning on said judging means.

2. A constant speed running apparatus according to claim 1, wherein the response of said actuator means is improved as the amount of power source accumulated in said accumulating means increases.

3. A constant speed running apparatus according to claim 1, wherein said switching means is a set switch for storing a predetermined vehicle speed in said storage means.

4. A constant speed running apparatus according to claim 3, wherein said set switch is arranged such that, when actuated, said switch stores a vehicle running speed detected by said vehicle speed detecting means in said storage means.

5. A constant speed running apparatus according to claim 1, wherein said switching means is a resume switch for resuming the operation of said control means.

6. A constant speed running apparatus according to claim 1, wherein said accumulating means is a surge tank.

7. A constant speed running apparatus according to claim 1, wherein said power source supply means is a vacuum pump.

8. A constqnt speed running apparatus comprising:
   vehicle speed detecting means for detecting a running speed of a vehicle;
   storage means for storing a predetermined vehicle speed;
   actuator means for controlling the opening and closing operation of a throttle valve;
   electronic control means which makes a comparison between a vehicle running speed detected by said vehicle speed detecting means and a vehicle speed stored in said storage means and which controls said actuator means so that the difference between said running speed and said stored vehicle speed is zero;
   switching means for activating said electronic control means;
   accumulating means for accumulating a power source for driving said actuator means;
   power source supply means for supplying the power source to said accumulating means; and
   power source control means for controlling the operation of said power source supply means;
   wherein said power source supply means is activatible in response to the operation of said switching means and is provided with timing means whereby upon activation of said power source supply means by said switching means said power source supply means will be activated for a predetermined period of time so that the level of power supply in said accumulating means will initially be sufficient for driving said actuator means.

* * * * *